United States Patent
Singh et al.

(10) Patent No.: US 9,124,464 B2
(45) Date of Patent: Sep. 1, 2015

(54) METHODS AND APPARATUS FOR CHANNEL ESTIMATION IN MIMO-OFDM COMMUNICATION SYSTEM

(75) Inventors: Jaspreet Singh, Richardson, TX (US); Hoang Nguyen, Salinas, CA (US); Zhouyue Pi, Allen, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 330 days.

(21) Appl. No.: 13/594,573

(22) Filed: Aug. 24, 2012

(65) Prior Publication Data

US 2013/0051505 A1    Feb. 28, 2013

Related U.S. Application Data

(60) Provisional application No. 61/529,102, filed on Aug. 30, 2011.

(51) Int. Cl.
| H04K 1/10 | (2006.01) |
| H04L 27/28 | (2006.01) |
| H04L 25/03 | (2006.01) |
| H04L 27/26 | (2006.01) |
| H04L 5/00 | (2006.01) |
| H04L 25/02 | (2006.01) |

(52) U.S. Cl.
CPC ...... H04L 25/03949 (2013.01); H04L 25/0256 (2013.01); H04L 27/265 (2013.01); *H04L 5/0007* (2013.01); *H04L 25/0224* (2013.01)

(58) Field of Classification Search
CPC ............ H04L 25/0224; H04L 25/0256; H04L 25/03949

USPC .......................... 375/260, 267, 316, 346, 347
See application file for complete search history.

(56) References Cited

U.S. PATENT DOCUMENTS

| 8,446,975 | B2 * | 5/2013 | Guess et al. .................. 375/267 |
| 2008/0212722 | A1 | 9/2008 | Heikkila |
| 2009/0262853 | A1 | 10/2009 | Yoshida et al. |
| 2010/0087151 | A1 * | 4/2010 | Auer .......................... 455/67.11 |
| 2010/0117904 | A1 * | 5/2010 | Miyatani ....................... 342/373 |
| 2011/0019757 | A1 | 1/2011 | Yamada et al. |
| 2011/0110304 | A1 | 5/2011 | Kuchi et al. |
| 2011/0129009 | A1 | 6/2011 | Doan et al. |
| 2011/0200030 | A1 * | 8/2011 | Noh et al. ..................... 370/344 |
| 2012/0020426 | A1 * | 1/2012 | Kim et al. ..................... 375/285 |
| 2012/0147829 | A1 * | 6/2012 | Zhang et al. .................. 370/329 |

OTHER PUBLICATIONS

Peter Hoeher, et al., "Two-Dimensional Pilot-Symbol-Aided Channel Estimation by Wiener Filtering," Institute for Communication Technology, German Aerospace Research Establishment (DLR), pp. 1845-1848.
International Search Report dated Feb. 20, 2013 in connection with International Patent Application No. PCT/KR2012/006934, 3 pages.
Written Opinion of International Searching Authority dated Feb. 20, 2013 in connection with International Patent Application No. PCT/KR2012/006934, 4 pages.

* cited by examiner

*Primary Examiner* — Freshteh N Aghdam (57) ABSTRACT

A wireless receiver is configured to perform a method of channel estimation in a multiple input multiple output (MIMO) network. The method includes despreading a vector of received samples to determine an average channel estimate for each of a plurality of multiplexed layers associated with the MIMO network, canceling inter-layer interference using the average channel estimates for the layers and obtaining a time-varying estimate for each layer, and estimating the channel using a two-dimensional minimum mean squared error (2D MMSE) technique.

20 Claims, 4 Drawing Sheets

FIGURE 5 ed by different physical antennas or effective antennas. The combined data streams are then received at multiple antennas of a receiver. At the receiver, each data stream is separated and extracted from the combined signal. This process can be performed, for example, using a maximum likelihood MIMO detection algorithm, or a minimum mean squared error (MMSE) MIMO algorithm. A key requirement for any MIMO detection algorithm is the knowledge of the MIMO channel (channel at all the different layers) at the receiver. Typically, the receiver obtains these estimates using the received samples at known pilot symbol locations, employing for example, a MMSE algorithm.

METHODS AND APPARATUS FOR CHANNEL ESTIMATION IN MIMO-OFDM COMMUNICATION SYSTEM

CROSS-REFERENCE TO RELATED APPLICATION(S) AND CLAIM OF PRIORITY

The present application is related to U.S. Provisional Patent Application No. 61/529,102, filed Aug. 30, 2011, entitled "METHODS AND APPARATUS FOR CHANNEL ESTIMATION IN MIMO-OFDM COMMUNICATION SYSTEM". Provisional Patent Application No. 61/529,102 is assigned to the assignee of the present application and is hereby incorporated by reference into the present application as if fully set forth herein. The present application hereby claims priority under 35 U.S.C. §119(e) to U.S. Provisional Patent Application No. 61/529,102.

TECHNICAL FIELD

The present application relates generally to wireless communication systems and, more specifically, to methods for channel estimation in a multiple input multiple output (MIMO) orthogonal frequency division multiplex (OFDM) communication system.

BACKGROUND

Modern communications demand higher data rates and performance. Multiple input, multiple output (MIMO) antenna systems, also known as multiple-element antenna (MEA) systems, achieve greater spectral efficiency for allocated radio frequency (RF) channel bandwidths by utilizing space or antenna diversity at both the transmitter and the receiver, or in other cases, the transceiver. In MIMO systems, each of a plurality of data streams (or layers) is individually mapped and modulated before being precoded and transmitted by different physical antennas or effective antennas. The combined data streams are then received at multiple antennas of a receiver. At the receiver, each data stream is separated and extracted from the combined signal. This process can be performed, for example, using a maximum likelihood MIMO detection algorithm, or a minimum mean squared error (MMSE) MIMO algorithm. A key requirement for any MIMO detection algorithm is the knowledge of the MIMO channel (channel at all the different layers) at the receiver. Typically, the receiver obtains these estimates using the received samples at known pilot symbol locations, employing for example, a MMSE algorithm.

SUMMARY

A method of channel estimation for use in a wireless receiver in a multiple input multiple output (MIMO) network is provided. The method includes despreading a vector of received samples to determine an average channel estimate for each of a plurality of multiplexed layers associated with the MIMO network, canceling inter-layer interference using the average channel estimates for the layers and obtaining a time-varying estimate for each layer, and estimating the channel using a two-dimensional minimum mean squared error (2D MMSE) technique.

A wireless terminal capable of channel estimation in a MIMO network is provided. The wireless terminal includes a processor configured to despread a vector of received samples to determine an average channel estimate for each of a plurality of multiplexed layers associated with the MIMO network, cancel inter-layer interference using the average channel estimates and obtain a time-varying estimate for each layer, and estimate the channel using a 2D MMSE technique.

A receiver apparatus, configured for use in a wireless receiver in a MIMO network and capable of channel estimation, is provided. The receiver apparatus includes a terminal chip configured to despread a vector of received samples to determine an average channel estimate for each of a plurality of multiplexed layers associated with the MIMO network, cancel inter-layer interference using the average channel estimates and obtain a time-varying estimate for each layer, and estimate the channel using a 2D MMSE technique.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication network.

The following document is hereby incorporated into the present disclosure as if fully set forth herein: 3GPP Technical Specification No. 36.211, version 10.5.0, "Evolved Universal Terrestrial Radio Access (E-UTRA); Physical Channels and Modulation", June 2012 (hereinafter "REF1").

With regard to the following description, it is noted that the 3GPP Long Term Evolution (LTE) term "node B" is another term for "base station" used below. Also, the LTE term "user equipment" or "UE" is another term for "subscriber station" (or "SS") used below.

LTE-Advanced ("LTE-A") is arguably the most important mobile broadband technology at the present time for the wireless industry. Embodiments of this disclosure address an important issue in the area of LTE-A modem algorithms. Channel estimation is a key component of a terminal chip. Embodiments of this disclosure provide a new channel estimation method. Performance comparisons between the disclosed new channel estimation method and existing channel estimators are also provided.

Figure 1:
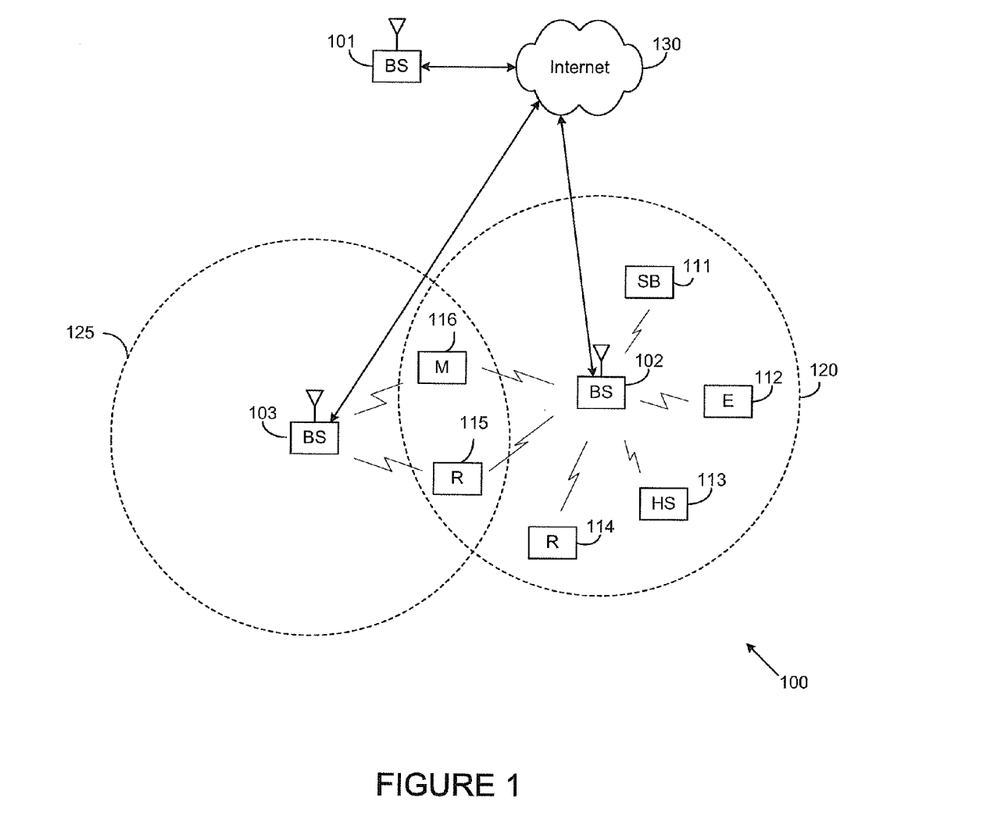
FIG. 1 illustrates a wireless communication network, according to embodiments of this disclosure.

FIG. 1 illustrates a wireless communication network, according to embodiments of this disclosure. The embodiment of wireless communication network 100 illustrated in FIG. 1 is for illustration only. Other embodiments of the wireless communication network 100 could be used without departing from the scope of this disclosure.

In the illustrated embodiment, the wireless communication network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of subscriber stations (also referred to herein as mobile stations) within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Each base station 101-103 can have a globally unique base station identifier (BSID). A BSID is often a MAC (media access control) ID. Each base station 101-103 can have multiple cells (e.g., one sector can be one cell), each with a physical cell identifier, or a preamble sequence, which is often carried in the synchronization channel.

While only six subscriber stations are depicted in FIG. 1, it is understood that the wireless communication network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. For example, subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
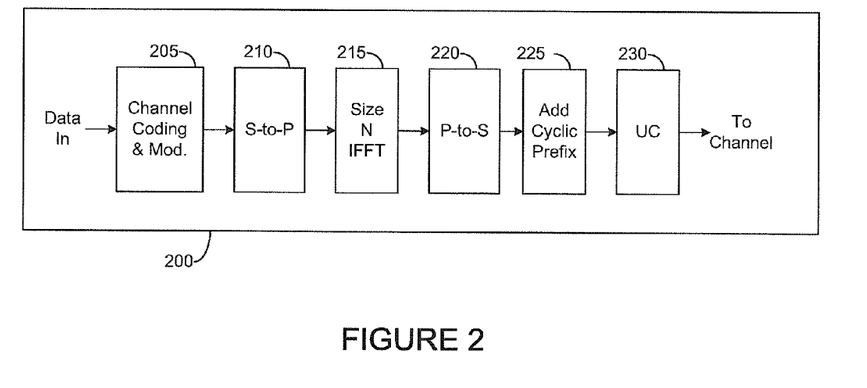
FIG. 2 is a high-level diagram of an orthogonal frequency division multiplex (OFDM) or orthogonal frequency division multiple access (OFDMA) transmit path, according to embodiments of this disclosure.
Figure 3:
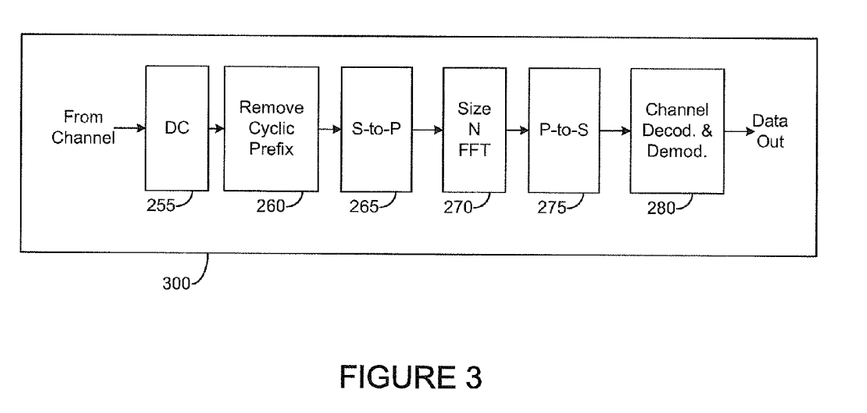
FIG. 3 is a high-level diagram of an OFDM or OFDMA receive path, according to embodiments of this disclosure.

FIG. 2 is a high-level diagram of an OFDM or OFDMA transmit path, according to embodiments of this disclosure. FIG. 3 is a high-level diagram of an OFDM or OFDMA receive path, according to embodiments of this disclosure. In FIGS. 2 and 3, the transmit path 200 may be implemented, e.g., in base station (BS) 102 and the receive path 300 may be implemented, e.g., in a subscriber station, such as subscriber station 116 of FIG. 1. It will be understood, however, that the receive path 300 could be implemented in a base station (e.g. base station 102 of FIG. 1) and the transmit path 200 could be implemented in a subscriber station. All or part of the transmit path 200 and the receive path 300 may comprise, or be comprised of, one or more processors. Likewise, all or part of the transmit path 200 and the receive path 300 may comprise, or be comprised of, one or more integrated circuit (IC) chips, such as a terminal chip.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 300 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

In 3GPP LTE-Advanced ("LTE-A") downlink, DM-RS (demodulation reference signal) symbols are pilots transmitted along with data (see, e.g., REF1). Using the DM-RS symbols, the UE (user equipment) performs channel estimation and equalization for demodulation of the data transmitted on different layers. The design of the DM-RS is such that pilots corresponding to different layers are code division multiplexed (CDM) onto the same set of resource elements (REs), where a RE denotes a single time-frequency unit) on the OFDM time-frequency grid. That is, the DM-RS symbols for a first layer occupy one set of REs, and the DM-RS symbols for a second layer occupy the same set of REs, but the DM-RS for the two layers are multiplexed using orthogonal codes.

Figure 4:
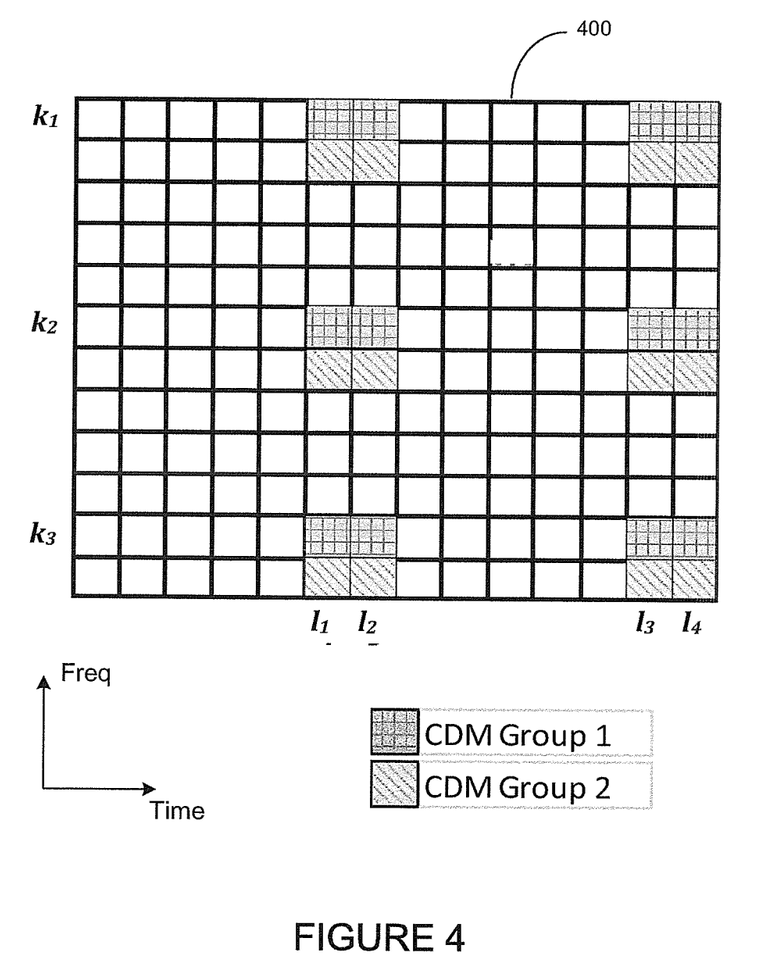
FIG. 4 depicts demodulation reference signal (DM-RS) locations in a Long Term Evolution-Advanced (LTE-A) subframe according to an embodiment of this disclosure.

FIG. 4 depicts DM-RS locations in a LTE-A subframe according to an embodiment of this disclosure. The embodiment of the subframe (SF) 400 illustrated in FIG. 4 is for illustration only. For ease of explanation, the SF 400 is depicted with a frequency band of only twelve frequency subcarriers. Other embodiments of the SF 400 (including embodiments with more or fewer frequency subcarriers) could be used without departing from the scope of this disclosure.

The SF 400 includes two CDM groups, CDM Group 1 and CDM Group 2. Each of the CDM groups includes a number of resource elements (REs), as shown in FIG. 4. In a four layer transmission, each of CDM Group 1 and CDM Group 2 supports two layers. In an eight-layer transmission, each of CDM Group 1 and CDM Group 2 supports four layers. For any particular reference frequency subcarrier (i.e., a subcarrier (or a frequency unit) that carries reference resource elements), the group of reference symbols for different layers within the same CDM group are selected to be orthogonal Walsh code sequences. For example, if there are two layers in a CDM group, the reference symbols used at a particular sub-carrier could be [1 1 1 1] for the first layer and [1 −1 1 −1] for the second layer, where [1 1 1 1] and [1 −1 1 −1] are orthogonal sequences.

DM-RS Channel Estimation

Since the reference symbols for different CDM groups are non-overlapping, a UE may perform channel estimation independently for each CDM group. Therefore, in the embodiments described below, channel estimation for only one CDM group is considered. Those skilled in the art will understand that the principles described herein apply to each CDM group. Further, for simplicity of discussion, embodiments having two multiplexed layers within the CDM group are considered. Those skilled in the art will understand that the principles described herein apply to CDM groups having more than two layers. Finally, it is assumed that the samples received at the different receiver antennas are uncorrelated. Under this assumption, the channel estimates for different receiver antennas can be obtained separately, so only a single receive antenna is considered.

A number of different channel estimation techniques are known in the art. These techniques are usually characterized by sub-optimal performance (due to their failure to exploit time correlations or account for inter-layer interference), or by prohibitively high computational complexity. A number of these techniques will now be described.

One low-complexity method is one-dimensional minimum mean squared error (1D MMSE). In 1D MMSE, it is assumed that the channel is constant over time. Based on this assumption, the channel is first despread in time. Despreading gives a single estimate of the channel at each frequency location for each layer, while also suppressing the inter-layer interference. Then 1D MMSE takes advantage of the existing correlations between the received samples across frequencies to estimate the channel. 1D MMSE is characterized by low complexity because it ignores channel time variation. However, because channel time variation is not taken into account, 1D MMSE offers sub-optimal performance when the channel actually varies over time (e.g., for moderate to high values of the Doppler frequency shift).

Another method is two-dimensional MMSE (2D MMSE). 2D MMSE takes advantage of the existing correlations between the samples across both time and frequency. For example, if it is assumed that the reference resource elements (REs) for two different layers are non-overlapping, the channel for each layer can be estimated independently, using a 2D MMSE estimator that exploits the channel time and frequency correlations. The channel estimation can be given by the equation $$\hat{h}_m(k,l) = F_m^H(k,l) r_m,\qquad\text{[Eqn. 1]}$$

where $r_m$ is a vector representing the set of received symbols across the reference REs for layer m, $F_m^H(k,l)$ is the MMSE filter for layer m at the reference RE location indexed by the pair (k,l) on the frequency-time grid, and $\hat{h}_m(k,l)$ is the channel estimate for layer m at RE location (k,l). However, for DM-RS channel estimation, since the DM-RS symbols corresponding to different layers are multiplexed on to the same set of resource elements, if 2D MMSE is implemented naively (that is, if inter-layer interference is ignored), inter-layer interference could degrade the performance. Thus, 2D MMSE is characterized by medium complexity, but sub-optimal performance because it does not take into account inter-layer interference suppression.

In principle, a 3D MMSE channel estimator may also be considered. A 3D MMSE channel estimator exploits time and frequency correlations, and also accounts for inter-layer interference. However, the prohibitive complexity of the 3D estimator makes it less attractive from a practical standpoint.

Embodiments of this disclosure provide a new method for DM-RS channel estimation, which serves the dual purpose of suppressing the inter-layer interference, and exploiting the channel time correlations, while having a complexity level similar to the complexity level of the conventional 2D MMSE channel estimator. The channel estimation method described herein may be referred to as the "despread+cancel+2D MMSE" channel estimation method. The method involves despreading of the received data across the DM-RS REs for the multiplexed layers, followed by an explicit cancellation of the inter layer interference, and finally an application of a 2D MMSE channel estimator.

Figure 5:
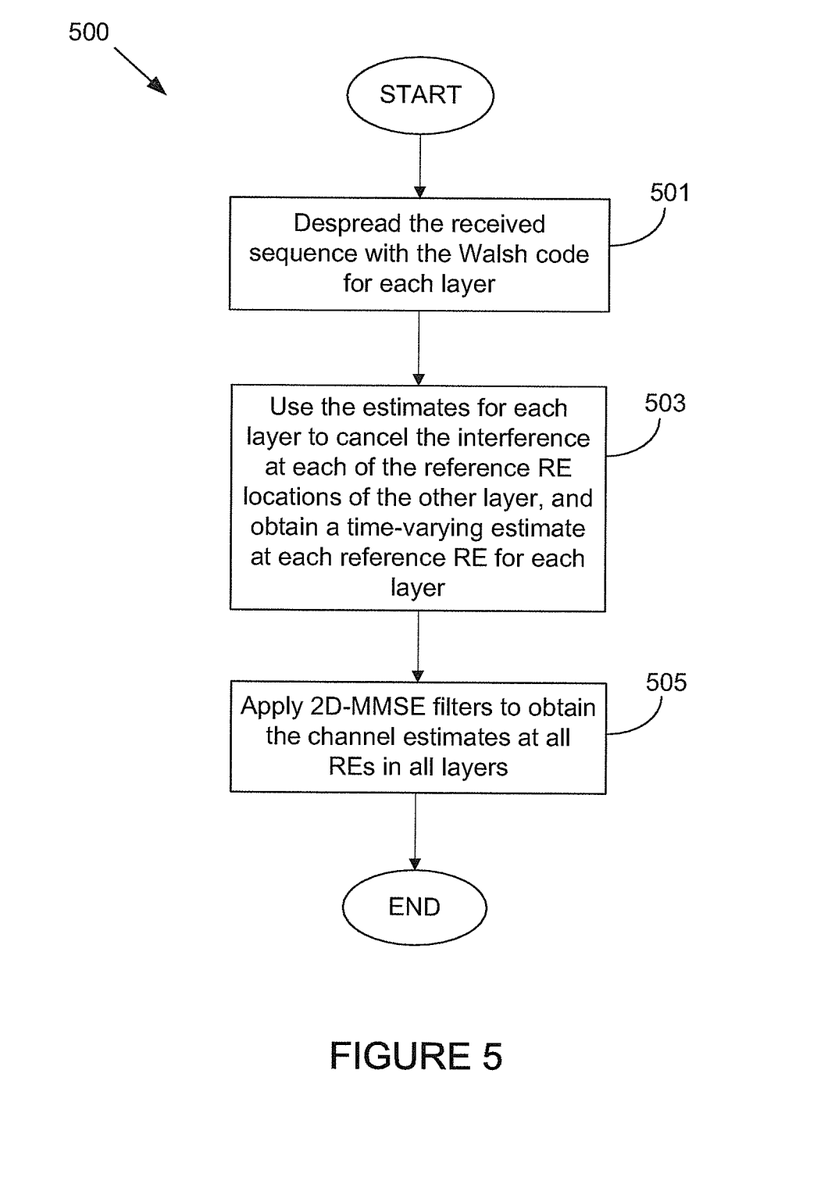
FIG. 5 illustrates a channel estimation method according to an embodiment of this disclosure.

FIG. 5 illustrates the despread+cancel+2D MMSE channel estimation method according to an embodiment of this disclosure. The embodiment of the channel estimation method 500 illustrated in FIG. 5 is for illustration only. Other embodiments of the channel estimation method 500 could be used without departing from the scope of this disclosure.

The channel estimation method 500 will now be illustrated using an example scenario of a two-layer transmission. However, those of skill in the art will understand that the principles disclosed herein are applicable for transmissions having more than two layers. In the example, the vector r of received samples at the reference DM-RS REs for a particular subcarrier is denoted as $r=[r_1\ r_2\ r_3\ r_4]$, where the received samples $r_1$, $r_2$, $r_3$, and $r_4$ are given by:

$$r_i = h_{1i}x_{1i} + h_{2i}x_{2i} + n_i, (i=1,2,3,4) \quad \text{[Eqn. 2]}$$

where $h_1=[h_{11}\ h_{12}\ h_{13}\ h_{14}]$ is the vector of channels at the reference REs in the first layer (layer 1), $h_2=[h_{21}\ h_{22}\ h_{23}\ h_{24}]$ is the vector of channels at the reference REs in the second layer (layer 2), $x_1=[x_{11}\ x_{12}\ x_{13}\ x_{14}]$ is the Walsh code sequence for layer 1, $x_2=[x_{21}\ x_{22}\ X_{23}\ x_{24}]$ is the Walsh code sequence for layer 2, and $n_i$ is additive white Gaussian noise.

In operation 501, an operator (which may represent a processor, a terminal chip, a receiver, a mobile station, etc.) despreads the received sequence with the Walsh code for each layer. The despreading operation provides a single "average" channel estimate for each layer separately. The estimates are denoted as $\hat{h}_1$ and $\hat{h}_2$. That is, $\hat{h}_1$ is the average channel estimate for the first layer, and $\hat{h}_2$ is the average channel estimate for the second layer. More specifically, the despreading operation can be represented as $\hat{h}_1=(r\cdot x_1)/(x_1\cdot x_1)$, and $\hat{h}_2=(r\cdot x_2)/(x_2\cdot x_2)$, where, as before, $x_l$ and $x_2$ are the Walsh code sequences for the two layers, and $(r\cdot x_1)$, for example, denotes the inner product (also referred to as the dot product or the scalar product) of the vectors r and $x_1$. For instance, if the two Walsh code sequences are $x_1=[1\ 1\ 1\ 1]$ and $x_2=[1\ 1\ -1\ -1]$, then $\hat{h}_1=\frac{1}{4}(r_1+r_2+r_3+r_4)$, and $\hat{h}_2=\frac{1}{4}(r_1+r_2-r_3-r_4)$.

In operation 503, the operator uses the estimates for each layer ($\hat{h}_1$ and $\hat{h}_2$) to explicitly cancel the interference from one layer to the other, at each of the reference RE locations. Specifically, the operator uses $\hat{h}_1$ to generate channel estimates $\hat{h}_{2i}$ at the REs ($r_1$, $r_2$, $r_3$, and $r_4$) for the second layer, and use $\hat{h}_2$ to generate channel estimates $\hat{h}_{1i}$ at the REs ($r_1$, $r_2$, $r_3$, and $r_4$) for the first layer. The operator uses the following equation to determine the channel estimates at each RE for each layer:

$$\hat{h}_{1i} = \frac{r_i - \hat{h}_2 x_{2i}}{x_{1i}};\ \hat{h}_{2i} = \frac{r_i - \hat{h}_1 x_{1i}}{x_{2i}};\ (i=1,2,3,4). \quad \text{[Eqn. 3]}$$

The same procedure of despreading and canceling, as described above, is performed for other frequency sub-carriers that contain the DM-RS symbols.

Equation 3 provides a time varying estimate of the channel at the DM-RS REs for both layers. In addition to this described method of obtaining time varying estimates for the channel across the two layers, it is possible that other methods that use the average despread channel estimates $\hat{h}_1$ and $\hat{h}_2$ to obtain time-varying channel estimates may be employed.

In operation 505, now that the operator has determined an interference-suppressed, and time-varying, channel estimate at each reference RE location for both layers, the operator independently applies 2D MMSE filters for both the layers, to obtain the channel estimates at all REs (which may include the DM-RS REs). The 2D filters are applied on the time-varying channel estimates obtained at the DM-RS RE locations after the despreading and canceling operations (illustrated in the preceding description).

Although FIG. 5 illustrates one example of a channel estimation method 500, various changes may be made to FIG. 5. For example, various operations in FIG. 5 may overlap, occur in parallel, occur in a different order, or occur multiple times. For example, the following iterative approach may be used: The time varying estimates for layer 1, obtained after despreading and canceling operations, may again be used to further refine the estimates across layer 2, and vice versa. Also, the channel estimation method 500 is generally applicable to any scenario where the data pilots for different layers are multiplexed, not just DM-RS channel estimation in LTE/LTE-A.

The despreading and cancelling operations are performed at all subcarriers containing the DM-RS REs. Afterward, the 2D MMSE filters are applied to obtain the channel estimates at all RE locations using the channel estimates obtained after despread and cancel operations. In another embodiment, the despread and cancel operations may be performed only on a subset of the frequency subcarriers carrying the DM-RS REs. Similarly, only a subset of the DM-RS REs at any particular sub-carrier containing the DM-RS REs may be employed while performing the despreading or canceling operations. Finally, the subsequent 2D MMSE channel estimation may be performed only on a subset of the REs.

Once the despreading and canceling operations have been performed, the 2D MMSE filters are applied to exploit the channel time and frequency correlations. In another embodiment, it is possible that a different channel estimator (other than a 2D MMSE estimator) may be used after the despreading and canceling operations.

Performance Comparison

A performance comparison of the channel estimation method 500 reveals that the method 500 significantly outperforms both despread+1D MMSE channel estimation and naive 2D MMSE channel estimation. As determined in one performance test, for small values of the Doppler shift (e.g., 20 Hz), an estimator using the channel estimation method 500 provided up to 5 dB gains in the mean square error performance over the despread+1D MMSE estimator. The performance of the naive 2D MMSE estimator was significantly worse. For medium to high Doppler shifts (e.g., >50 Hz), the performance of the despread+1D MMSE estimator was also significantly worse than the estimator using the channel estimation method 500.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless receiver in a multiple input multiple output (MIMO) network, a method of channel estimation, the method comprising:

despreading a vector of received samples to determine an average channel estimate for each of a plurality of multiplexed layers associated with the MIMO network;
canceling inter-layer interference using the average channel estimates for the multiplexed layers and obtaining a time-varying estimate for each multiplexed layer; and
estimating a channel using a two-dimensional minimum mean squared error (2D MMSE) technique on the time-varying estimate for each multiplexed layer.

2. The method of claim 1, wherein canceling inter-layer interference comprises canceling inter-layer interference at each of a plurality of reference resource element (RE) locations to determine a different channel estimate at each RE for each layer.

3. The method of claim 2, wherein the plurality of layers comprises a first layer and a second layer, and canceling inter-layer interference comprises using the average channel estimate for the first layer to generate channel estimates for each reference RE location in the second layer and using the average channel estimate for the second layer to generate channel estimates for each reference RE location in the first layer.

4. The method of claim 3, wherein the channel estimate at each RE for each layer is determined according to the equation:

$$\hat{h}_{1i} = \frac{r_i - \hat{h}_2 x_{2i}}{x_{1i}}; \hat{h}_{2i} = \frac{r_i - \hat{h}_1 x_{1i}}{x_{2i}}; (i = 1, 2, 3, 4)$$

where $\hat{h}_{1i}$ is the channel estimate for the first layer at RE i, $\hat{h}_{2i}$ is the channel estimate for the second layer at RE i, $\hat{h}_1$ is the average channel estimate for the first layer, $\hat{h}_2$ is the average channel estimate for the second layer, $x_{1i}$ is a Walsh code sequence value for the first layer at RE i, $x_{2i}$ is a Walsh code sequence value for the second layer at RE i, and $r_i$ is the received sample associated with RE i.

5. The method of claim 2, wherein estimating the channel using the 2D MMSE technique comprises applying 2D MMSE filters to obtain the channel estimates at each RE for each layer.

6. The method of claim 1, wherein the MIMO network is a MIMO orthogonal frequency division multiplex (OFDM) network.

7. The method of claim 2, wherein the reference RE locations in each layer are associated with a code division multiplexed (CMD) group.

8. A wireless terminal capable of channel estimation in a multiple input multiple output (MIMO) network, the wireless terminal comprising:
a plurality of antennas configured to receive one or more signals;
a processor configured to:
despread a vector of received samples to determine an average channel estimate for each of a plurality of multiplexed layers associated with the MIMO network;
cancel inter-layer interference using the average channel estimates and obtain a time-varying estimate for each multiplexed layer; and
estimate a channel using a two-dimensional minimum mean squared error (2D MMSE) technique on the time-varying estimate for each multiplexed layer, wherein the plurality of antennas are coupled to the processor.

9. The wireless terminal of claim 8, wherein the processor is configured to cancel the inter-layer interference by canceling the inter-layer interference at each of a plurality of reference resource element (RE) locations to determine a different channel estimate at each RE for each layer.

10. The wireless terminal of claim 9, wherein the plurality of layers comprises a first layer and a second layer, and the processor is configured to cancel the inter-layer interference by using the average channel estimate for the first layer to generate channel estimates for each reference RE location in the second layer and using the average channel estimate for the second layer to generate channel estimates for each reference RE location in the first layer.

11. The wireless terminal of claim 10, wherein the channel estimate at each RE for each layer is determined according to the equation:

$$\hat{h}_{1i} = \frac{r_i - \hat{h}_2 x_{2i}}{x_{1i}}; \hat{h}_{2i} = \frac{r_i - \hat{h}_1 x_{1i}}{x_{2i}}; (i = 1, 2, 3, 4)$$

where $\hat{h}_{1i}$ is the channel estimate for the first layer at RE i, $\hat{h}_{2i}$ is the channel estimate for the second layer at RE i, $\hat{h}_1$ is the average channel estimate for the first layer, $\hat{h}_2$ is the average channel estimate for the second layer, $x_{1i}$ is a Walsh code sequence value for the first layer at RE i, $x_{2i}$ is a Walsh code sequence value for the second layer at RE i, and $r_i$ is the received sample associated with RE i.

12. The wireless terminal of claim 9, wherein the processor is configured to estimate the channel using the 2D MMSE technique by applying 2D MMSE filters to obtain the channel estimates at each RE for each layer.

13. The wireless terminal of claim 8, wherein the MIMO network is a MIMO orthogonal frequency division multiplex (OFDM) network.

14. The wireless terminal of claim 9, wherein the reference RE locations in each layer are associated with a code division multiplexed (CMD) group.

15. A wireless terminal capable of channel estimation in a multiple input multiple output (MIMO) network, the wireless terminal comprising:
a plurality of antennas configured to receive one or more signals;
a terminal chip configured to:
despread a vector of received samples to determine an average channel estimate for each of a plurality of multiplexed layers associated with the MIMO network;
cancel inter-layer interference using the average channel estimates and obtain a time-varying estimate for each multiplexed layer; and
estimate a channel using a two-dimensional minimum mean squared error (2D MMSE) technique on the time-varying estimate for each multiplexed layer, wherein the plurality of antennas are coupled to the terminal chip.

16. The receiver apparatus of claim 15, wherein the terminal chip is configured to cancel the inter-layer interference by canceling the inter-layer interference at each of a plurality of reference resource element (RE) locations to determine a different channel estimate at each RE for each layer.

17. The receiver apparatus of claim 16, wherein the plurality of layers comprises a first layer and a second layer, and the terminal chip is configured to cancel the inter-layer interference by using the average channel estimate for the first layer to generate channel estimates for each reference RE location in the second layer and using the average channel estimate for the second layer to generate channel estimates for each reference RE location in the first layer.

18. The receiver apparatus of claim 17, wherein the channel estimate at each RE for each layer is determined according to the equation:

$$\hat{h}_{1i} = \frac{r_i - \hat{h}_2 x_{2i}}{x_{1i}}; \hat{h}_{2i} = \frac{r_i - \hat{h}_1 x_{1i}}{x_{2i}}; (i = 1, 2, 3, 4)$$

where $\hat{h}_{1i}$ is the channel estimate for the first layer at RE i, $\hat{h}_{2i}$ is the channel estimate for the second layer at RE i, $\hat{h}_1$ is the average channel estimate for the first layer, $\hat{h}_2$ is the average channel estimate for the second layer, $x_{1i}$ is a Walsh code sequence value for the first layer at RE i, $x_{2i}$ is a Walsh code sequence value for the second layer at RE i, and $r_i$ is the received sample associated with RE i.

19. The receiver apparatus of claim 16, wherein the terminal chip is configured to estimate the channel using the 2D MMSE technique by applying 2D MMSE filters to obtain the channel estimates at each RE for each layer.

20. The receiver apparatus of claim 15, wherein the MIMO network is a MIMO orthogonal frequency division multiplex (OFDM) network.

* * * * *